US011216242B2

(12) United States Patent
Yamada

(10) Patent No.: US 11,216,242 B2
(45) Date of Patent: Jan. 4, 2022

(54) AUDIO OUTPUT SYSTEM, AUDIO OUTPUT METHOD, AND COMPUTER PROGRAM PRODUCT

(71) Applicants: KABUSHIKI KAISHA TOSHIBA, Minato-ku (JP); TOSHIBA DIGITAL SOLUTIONS CORPORATION, Kawasaki (JP)

(72) Inventor: Yuki Yamada, Yokohama (JP)

(73) Assignees: KABUSHIKI KAISHA TOSHIBA, Minato-ku (JP); TOSHIBA DIGITAL SOLUTIONS CORPORATION, Kawasaki (JP)

( * ) Notice: Subject to any disclaimer, the term of this patent is extended or adjusted under 35 U.S.C. 154(b) by 89 days.

(21) Appl. No.: 16/279,630

(22) Filed: Feb. 19, 2019

(65) Prior Publication Data
US 2019/0258452 A1 Aug. 22, 2019

(30) Foreign Application Priority Data
Feb. 19, 2018 (JP) .............................. JP2018-026951

(51) Int. Cl.
*G10L 15/22* (2006.01)
*G06F 3/16* (2006.01)
*G10L 25/48* (2013.01)
*G10L 15/00* (2013.01)

(52) U.S. Cl.
CPC .............. *G06F 3/165* (2013.01); *G10L 15/00* (2013.01); *G10L 15/005* (2013.01); *G10L 25/48* (2013.01)

(58) Field of Classification Search
CPC ............. H04S 7/303; H04S 1/00; G10L 15/22
See application file for complete search history.

(56) References Cited

U.S. PATENT DOCUMENTS

| 6,983,251 B1* | 1/2006 | Umemoto | H04R 5/04 704/270 |
| 9,124,984 B2* | 9/2015 | Yamada | H04R 25/407 |
| 2012/0062729 A1* | 3/2012 | Hart | H04N 7/142 348/135 |
| 2014/0278435 A1* | 9/2014 | Ganong, III | G10L 15/22 704/275 |

(Continued)

FOREIGN PATENT DOCUMENTS

| EP | 3 361 755 A1 | 8/2018 |
| WO | WO 2017/061218 A1 | 4/2017 |

*Primary Examiner* — Shreyans A Patel
(74) *Attorney, Agent, or Firm* — Oblon, McClelland, Maier & Neustadt, L.L.P.

(57) ABSTRACT

An audio output system according to an embodiment has functions as: a receiving unit that receives voice data including a voice or sound data including a sound as output-data to be output; a content identification information generating unit that generates content identification information for identifying content that is determined from the output-data; a status identification information generating unit that generates status identification information for identifying a status from at least one of sensor data and input data; a parameter information generating unit that generates parameter information used for controlling output of the output-data from the content identification information and the status identification information; and an output control unit that controls audio output of the output-data by using the parameter information.

14 Claims, 13 Drawing Sheets

(56) References Cited

U.S. PATENT DOCUMENTS

2015/0201275 A1* 7/2015 Lee .................... H04R 1/1041
   381/74
2016/0210407 A1* 7/2016 Hwang .................. G06F 21/32
2018/0367937 A1* 12/2018 Asada ................... G10L 13/00

* cited by examiner

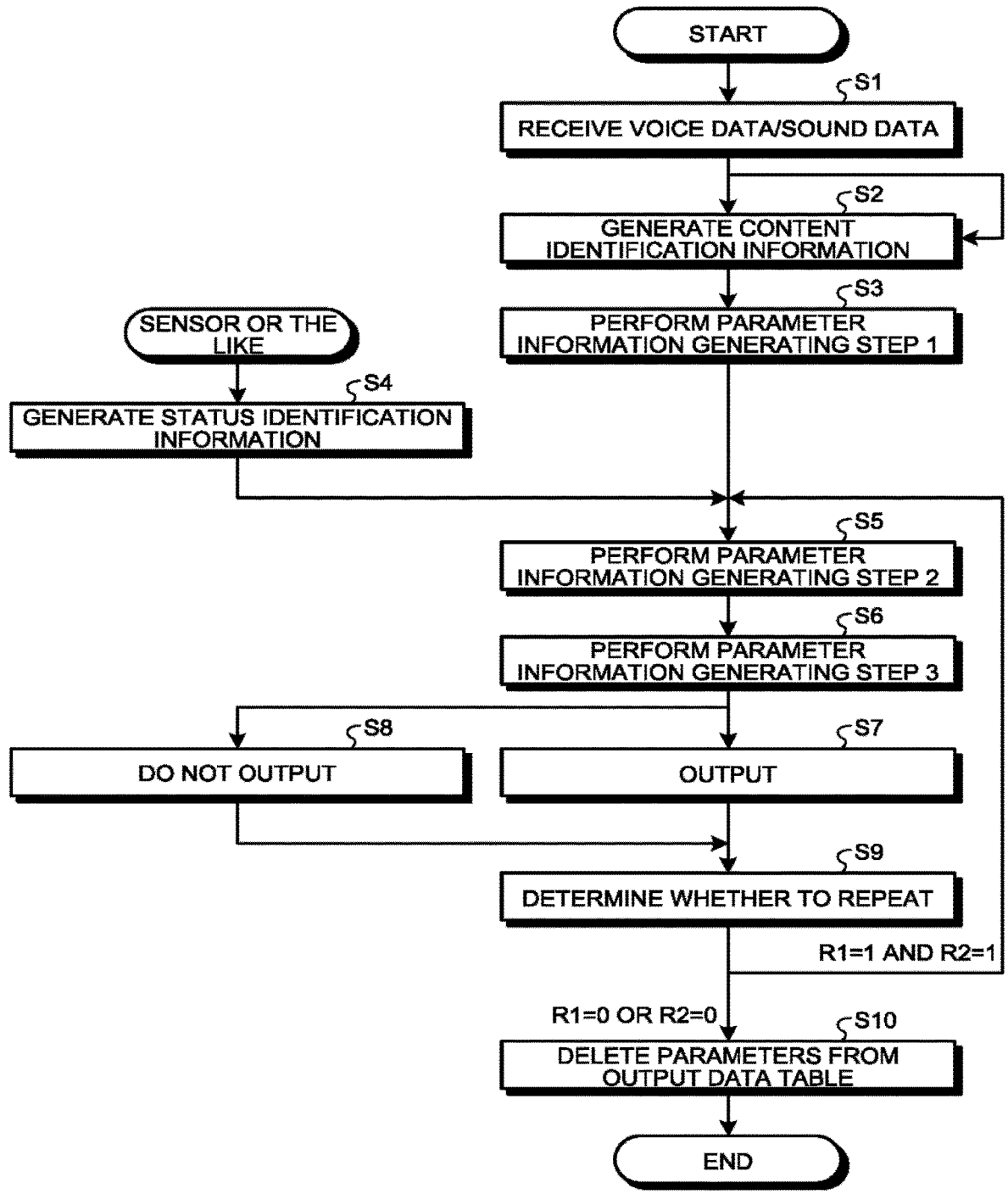

FIG.5

| OUTPUT DATA | | *** is ### (E.G., VOICE MESSAGE) | comment |
|---|---|---|---|
| ACQUISITION TIME [h/m/s] | time | hh:mm:ss | TIME AT WHICH OUTPUT DATA IS RECEIVED |
| DATA ID | ID | 123456 | IDENTIFICATION NUMBER ALLOCATED TO OUTPUT DATA |
| DATA PROCESSING TYPE | D | $\phi$ | $\phi$: FLOW TYPE, $\zeta$: LOG TYPE |
| DATA CURRENCY | N | $\eta$ | $\eta$: LATEST, $\delta$: OTHERS |
| CONTENT CLASSIFICATION | contents | Xi | Xi: AAA, Xii: BBB, Xiii: CCC, Xiv: OTHERS |
| STATUS 1 (STATUS) | S1 | $\xi$ | $\xi$: XXX, $\psi$: OTHERS |
| STATUS 2 (REPLAY COUNT) | num | 0 | INITIAL VALUE IS "0", AND "num" IS OVERWRITTEN BY SEQUENCE SUBSEQUENT TO "out" |
| REPETITION CONTROL 1 | R1 | 1 | R1=1 if {D=$\phi$ and N=$\eta$ }<br>else if {D=$\zeta$ };<br>};<br>else R1=0; |
| REPETITION CONTROL 2 | R2 | 1 | TAKE VALUE OF EITHER "1" OR "0" AS RESULT OF OPERATION (OPERATION PORTION CAN BE SPECIFIED FREELY. FOLLOWING GIVES ONE EXAMPLE)<br>R2=1 if {S1=$\xi$ };<br>else R2=0; |
| TAG APPENDED TO CONTENT | Xi | 1 | DESIGNATE VIRTUAL SOUND IMAGE TAG CORRESPONDING TO CONTENT Xi |
| | Xii | 2 | DESIGNATE DIRECTION TAG CORRESPONDING TO CONTENT Xii |
| | Xiii | 3 | DESIGNATE DIRECTION TAG CORRESPONDING TO CONTENT Xiii |
| | Xiv | 4 | DESIGNATE DIRECTION TAG CORRESPONDING TO CONTENT Xiv |
| LINK BETWEEN TAG AND OUTPUT CONDITION | 1 | $\theta_A, r_a$ | FROM ANGLE A, AT DISTANCE $r_a$ |
| | 2 | $\theta_B, r_b$ | FROM ANGLE B, AT DISTANCE $r_b$ |
| | 3 | $\theta_C, r_c$ | FROM ANGLE C, AT DISTANCE $r_c$ |
| | 4 | $\theta_D, r_d$ | FROM ANGLE D, AT DISTANCE $r_d$ |
| OUTPUT CONTROL | out | 1 | TAKE VALUE OF EITHER "1" OR "0" AS RESULT OF OPERATION (OPERATION PORTION CAN BE SPECIFIED FREELY. FOLLOWING GIVES ONE EXAMPLE)<br>out=1 if {num=0;<br>else if {num=0;<br>num=num+1;<br>}};<br>else out=0; |

FIG.6

| time [h/m/s] | ID |
|---|---|
| 09:24:40 | 123456 |
| 09:27:32 | 123457 |
| 09:42:19 | 123458 |
| 09:50:08 | 123459 |
| ⋮ | ⋮ |

FIG.7

| OUTPUT DATA | | FINISH CLEANING ROOM NUMBER 7 BY NINE | comment |
|---|---|---|---|
| ACQUISITION TIME [h/m/s] | time | 8:14:32 | AUTOMATICALLY INPUT WITH TIME AT WHICH OUTPUT DATA IS RECEIVED |
| DATA ID | ID | 123456 | IDENTIFICATION NUMBER ALLOCATED TO OUTPUT DATA (AUTOMATICALLY GENERATED) |
| DATA PROCESSING TYPE | D | $\zeta$ | $\phi$: FLOW TYPE, $\zeta$: LOG TYPE |
| DATA CURRENCY | N | $\eta$ | $\eta$: LATEST, $\delta$: OTHERS |
| CONTENT CLASSIFICATION | contents | X1 | X1: DIRECTED TO ROOM SERVICE PERSONNEL, X2: DIRECTED TO KITCHEN, X3: DIRECTED TO FRONT DESK, X4: DIRECTED TO ENTIRE EMPLOYEES |
| STATUS 1 (STATUS) | S1 | $\xi$ | $\xi$: REQUIRING ATTENTION, $\psi$: TASK COMPLETED, $\lambda$: FOR SHARING INFORMATION ONLY |
| STATUS 2 (REPLAY COUNT) | num | 0 | INITIAL VALUE IS "0", AND "num" IS OVERWRITTEN BY SEQUENCE SUBSEQUENT TO "out" |
| REPETITION CONTROL 1 | R1 | 1 | R1=1 if {D=$\phi$ and N=$\eta$}<br>else if {D=$\zeta$}<br>}<br>else R1=0; |
| REPETITION CONTROL 2 | R2 | 1 | (OPERATION PORTION CAN BE SPECIFIED FREELY. FOLLOWING GIVES ONE EXAMPLE)<br>R2=1 if {S1=$\xi$ ;<br>}<br>else R=0; |
| TAG APPENDED TO CONTENT | X1 | 1 | DESIGNATE VIRTUAL SOUND IMAGE TAG CORRESPONDING TO CONTENT X1 |
| | X2 | 2 | DESIGNATE VIRTUAL SOUND IMAGE TAG CORRESPONDING TO CONTENT X2 |
| | X3 | 3 | DESIGNATE VIRTUAL SOUND IMAGE TAG CORRESPONDING TO CONTENT X3 |
| | X4 | 4 | DESIGNATE VIRTUAL SOUND IMAGE TAG CORRESPONDING TO CONTENT X4 |
| LINK BETWEEN TAG AND OUTPUT CONDITION | 1 | $\theta$=135, r=1 | FROM ANGLE 135, AT DISTANCE $r_a$ |
| | 2 | $\theta$=225, r=1 | FROM ANGLE 225, AT DISTANCE $r_a$ |
| | 3 | $\theta$=270, r=1 | FROM ANGLE 270, AT DISTANCE $r_a$ |
| | 4 | $\theta$=45, r=2 | FROM ANGLE 45, AT DISTANCE $r_b$ ($r_a < r_b$) |
| OUTPUT CONTROL | out | 1 | TAKE VALUE OF EITHER "1" OR "0" AS RESULT OF OPERATION<br>(OPERATION PORTION CAN BE SPECIFIED FREELY. FOLLOWING GIVES ONE EXAMPLE)<br>out=1 if {contents=X1 or X4<br>then if {num=0;<br>else if {S1=$\zeta$ ;<br>num=num+1;<br>}}<br>else out=0; |

FIG.8

| OUTPUT DATA | | C STATION, C STATION | comment |
|---|---|---|---|
| ACQUISITION TIME [h/m/s] | time | 13:48:20 | AUTOMATICALLY INPUT WITH TIME AT WHICH OUTPUT DATA IS RECEIVED |
| DATA ID | ID | 123456 | IDENTIFICATION NUMBER ALLOCATED TO OUTPUT DATA (AUTOMATICALLY GENERATED) |
| DATA PROCESSING TYPE | D | $\phi$ | $\phi$: FLOW TYPE, $\xi$: LOG TYPE |
| DATA CURRENCY | N | $\eta$ | $\eta$: LATEST, $\delta$: OTHERS |
| CONTENT CLASSIFICATION | contents | X1 | X1: NAME OF PREVIOUS STOP, X2: NAME OF DESTINATION, X3: OTHERS |
| STATUS 1 (STATUS) | S1 | $\xi$ | $\xi$: WITHIN STATION AREA, $\psi$: OTHERS |
| STATUS 2 (REPLAY COUNT) | num | 0 | INITIAL VALUE IS "0", AND "num" IS OVERWRITTEN BY SEQUENCE SUBSEQUENT TO "out" |
| REPETITION CONTROL 1 | R1 | 1 | R1=1 if {D=$\phi$ and N=$\eta$}<br>else if {D=$\xi$<br>};<br>else R1=0; |
| REPETITION CONTROL 2 | R2 | 1 | TAKE VALUE OF EITHER "1" OR "0" AS RESULT OF OPERATION<br>(OPERATION PORTION CAN BE SPECIFIED FREELY; FOLLOWING GIVES ONE EXAMPLE)<br>R=1 if {num=0, num=1}<br>else R=0; |
| TAG APPENDED TO CONTENT | X1 | 1 | DESIGNATE VIRTUAL SOUND IMAGE TAG CORRESPONDING TO CONTENT X1 |
| | X2 | 2 | DESIGNATE VIRTUAL SOUND IMAGE TAG CORRESPONDING TO CONTENT X2 |
| | X3 | 3 | DESIGNATE VIRTUAL SOUND IMAGE TAG CORRESPONDING TO CONTENT X3 |
| LINK BETWEEN TAG AND OUTPUT CONDITION | 1 | $\theta$=90, r=1 | FROM ANGLE 90, AT DISTANCE $r_a$ |
| | 2 | $\theta$=235, r=1 | FROM ANGLE 235, AT DISTANCE $r_b$ |
| | 3 | $\theta$=0, r=1 | FROM ANGLE 0, AT DISTANCE $r_c$ |
| OUTPUT CONTROL | out | 1 | TAKE VALUE OF EITHER "1" OR "0" AS RESULT OF OPERATION<br>(OPERATION PORTION CAN BE SPECIFIED FREELY; FOLLOWING GIVES ONE EXAMPLE)<br>out=1 if {contents=X1 or X2;<br>and if {S1=$\xi$;<br>num=num+1;<br>}}<br>else out=0; |

FIG.9

| OUTPUT DATA | | *** is ○○○ (E.G., VOICE MESSAGE) | comment |
|---|---|---|---|
| ACQUISITION TIME [h/m/s] | time | 8:14:32 | AUTOMATICALLY INPUT WITH TIME AT WHICH OUTPUT DATA IS RECEIVED |
| DATA ID | ID | 123456 | IDENTIFICATION NUMBER ALLOCATED TO OUTPUT DATA (AUTOMATICALLY GENERATED) |
| DATA PROCESSING TYPE | D | ζ | φ: FLOW TYPE, ζ: LOG TYPE |
| DATA CURRENCY | N | η | η: LATEST, δ: OTHERS |
| CONTENT CLASSIFICATION | contents | X={X1,X2,X3} | X1: TITLE AND CHARACTERISTICS OF EXHIBITION, X2: BACKGROUND, X3: OTHERS |
| STATUS 1 (STATUS) | S1 | ξ | ξ: HAS STOPPED, ψ: MOVING, λ: THERE IS NOBODY (MOVEMENT OF VIEWERS FROM VIEWPOINT OF EXHIBITION) |
| STATUS 2 (REPLAY COUNT) | num | 0 | INITIAL VALUE IS "0", AND "num" IS OVERWRITTEN BY SEQUENCE SUBSEQUENT TO "out" |
| REPETITION CONTROL 1 | R1 | 1 | R1=1 if {D=φ and N=η} else if {D=ζ} ... else R1=0; |
| REPETITION CONTROL 2 | R2 | 1 | TAKE VALUE OF EITHER "1" OR "0" AS RESULT OF OPERATION (OPERATION PORTION CAN BE SPECIFIED FREELY; FOLLOWING GIVES ONE EXAMPLE) R2=1 if {num=0}; R2=0 if {num>=1}; |
| TAG APPENDED TO CONTENT | X1 | 1 | DESIGNATE VIRTUAL SOUND IMAGE TAG CORRESPONDING TO CONTENT X1 |
| | X2 | 2 | DESIGNATE VIRTUAL SOUND IMAGE TAG CORRESPONDING TO CONTENT X2 |
| | X3 | 3 | DESIGNATE VIRTUAL SOUND IMAGE TAG CORRESPONDING TO CONTENT X3 |
| LINK BETWEEN TAG AND OUTPUT CONDITION | 1 | θ=45, r=1 | FROM ANGLE 45, AT DISTANCE $r_a$ |
| | 2 | θ=225, r=1 | FROM ANGLE 225, AT DISTANCE $r_a$ |
| | 3 | θ=270, r=1 | FROM ANGLE 270, AT DISTANCE $r_a$ |
| OUTPUT CONTROL | out | 1 | TAKE VALUE OF EITHER "1" OR "0" AS RESULT OF OPERATION (OPERATION PORTION CAN BE SPECIFIED FREELY; FOLLOWING GIVES ONE EXAMPLE) out=1 if {num=0 and S1=ξ}; num=num+1; else out=0; |

FIG. 10

| OUTPUT DATA | | Hilf Mir! | comment |
|---|---|---|---|
| ACQUISITION TIME [h/m/s] | time | 15:14:32 | AUTOMATICALLY INPUT WITH TIME AT WHICH OUTPUT DATA IS RECEIVED |
| DATA ID | ID | 123456 | IDENTIFICATION NUMBER ALLOCATED TO OUTPUT DATA (AUTOMATICALLY GENERATED) |
| DATA PROCESSING TYPE | D | $\phi$ | $\phi$: FLOW TYPE, $\zeta$: LOG TYPE |
| DATA CURRENCY | N | $\eta$ | $\eta$: LATEST, $\delta$: OTHERS |
| CONTENT CLASSIFICATION | contents | X3 | X1: JAPANESE, X2: ENGLISH, X3: GERMAN, X4: OTHERS |
| STATUS 1 (STATUS) | S1 | $\xi$ | $\xi$: on, $\psi$: off |
| STATUS 2 (REPLAY COUNT) | num | 0 | INITIAL VALUE IS "0", AND "num" IS OVERWRITTEN BY SEQUENCE SUBSEQUENT TO "out" |
| REPETITION CONTROL 1 | R1 | 1 | R1=1 if {D=$\phi$ and N=$\eta$}<br>else if {D=$\zeta$}<br>{<br>}<br>else R1=0; |
| REPETITION CONTROL 2 | R2 | 0 | TAKE VALUE OF EITHER "1" OR "0" AS RESULT OF OPERATION (OPERATION PORTION CAN BE SPECIFIED FREELY. FOLLOWING GIVES ONE EXAMPLE)<br>R2=0; |
| TAG APPENDED TO CONTENT | X1 | 1 | DESIGNATE VIRTUAL SOUND IMAGE TAG CORRESPONDING TO CONTENT Xi |
| | X2 | 2 | DESIGNATE DIRECTION TAG CORRESPONDING TO CONTENT Xii |
| | X3 | 3 | DESIGNATE DIRECTION TAG CORRESPONDING TO CONTENT Xiii |
| | X4 | 4 | DESIGNATE DIRECTION TAG CORRESPONDING TO CONTENT Xiv |
| LINK BETWEEN TAG AND OUTPUT CONDITION | 1 | $\theta$=90, r=1 | FROM ANGLE 90, AT DISTANCE $r_a$ |
| | 2 | $\theta$=135, r=1 | FROM ANGLE 135, AT DISTANCE $r_b$ |
| | 3 | $\theta$=225, r=1 | FROM ANGLE 225, AT DISTANCE $r_c$ |
| | 4 | $\theta$=315, r=1 | FROM ANGLE 315, AT DISTANCE $r_d$ |
| OUTPUT CONTROL | out | 1 | TAKE VALUE OF EITHER "1" OR "0" AS RESULT OF OPERATION (OPERATION PORTION CAN BE SPECIFIED FREELY. FOLLOWING GIVES ONE EXAMPLE)<br>out=1 if {num=0;<br>and if {S1=$\xi$;<br>num=num+1;<br>}}<br>else out=0; |

FIG.11

| OUTPUT DATA | | | comment |
|---|---|---|---|
| | | YOUR DELIVERY PERSON HANDLED THE PRODUCT ROUGHLY | |
| ACQUISITION TIME [h/m/s] | time | 16:24:32 | AUTOMATICALLY INPUT WITH TIME AT WHICH OUTPUT DATA IS RECEIVED |
| DATA ID | ID | 123456 | IDENTIFICATION NUMBER ALLOCATED TO OUTPUT DATA (AUTOMATICALLY GENERATED) |
| DATA PROCESSING TYPE | D | $\phi$ | $\phi$: FLOW TYPE, $\zeta$: LOG TYPE |
| DATA CURRENCY | N | $\eta$ | $\eta$: LATEST, $\delta$: OTHERS |
| CONTENT CLASSIFICATION | contents | X1 | X1: COMPLAINT, X2: INQUIRY, X3: APPLICATION, X4: OTHERS |
| STATUS 1 (STATUS) | S1 | $\xi$ | $\xi$: HAS NOT BEEN ADDRESSED, $\psi$: HAS BEEN ADDRESSED |
| STATUS 2 (REPLAY COUNT) | num | 0 | INITIAL VALUE IS "0", AND "num" IS OVERWRITTEN BY SEQUENCE SUBSEQUENT TO "out" |
| REPETITION CONTROL 1 | R1 | 1 | R1=1 if {D=$\phi$ and N=$\eta$}<br>else if {D=$\zeta$<br>};<br>else R1=0; |
| REPETITION CONTROL 2 | R2 | 0 | TAKE VALUE OF EITHER "1" OR "0" AS RESULT OF OPERATION (OPERATION PORTION CAN BE SPECIFIED FREELY; FOLLOWING GIVES ONE EXAMPLE) R=0; |
| TAG APPENDED TO CONTENT | X1 | 1 | DESIGNATE VIRTUAL SOUND IMAGE TAG CORRESPONDING TO CONTENT X1 |
| | X2 | 2 | DESIGNATE VIRTUAL SOUND IMAGE TAG CORRESPONDING TO CONTENT X2 |
| | X3 | 3 | DESIGNATE VIRTUAL SOUND IMAGE TAG CORRESPONDING TO CONTENT X3 |
| | X4 | 4 | DESIGNATE VIRTUAL SOUND IMAGE TAG CORRESPONDING TO CONTENT X4 |
| LINK BETWEEN TAG AND OUTPUT CONDITION | 1 | $\theta$=135, r=1 | FROM ANGLE 135, AT DISTANCE $r_5$ |
| | 2 | $\theta$=225, r=1 | FROM ANGLE 225, AT DISTANCE $r_5$ |
| | 3 | $\theta$=270, r=1 | FROM ANGLE 270, AT DISTANCE $r_5$ |
| | 4 | $\theta$=270, r=1 | FROM ANGLE 270, AT DISTANCE $r_2$ |
| OUTPUT CONTROL | out | 1 | TAKE VALUE OF EITHER "1" OR "0" AS RESULT OF OPERATION (OPERATION PORTION CAN BE SPECIFIED FREELY; FOLLOWING GIVES ONE EXAMPLE) out=1;<br>#"out" IS FIXED, BECAUSE TO REPLAY/NOT TO REPLAY IS NOT SELECTED, AND ONLY USED IS FUNCTION FOR REPLAYING CONTENT IN DIRECTION ALLOWING OPERATOR TO LISTEN TO CONTENT EASILY<br>#IT IS POSSIBLE TO USE S1 PARAMETER WHEN INQUIRY IS TRANSFERRED TO ANOTHER OPERATOR SO THAT CALL IS ADDRESSED BY OPERATOR, BASED ON "HAS NOT BEEN ADDRESSED/HAS BEEN ADDRESSED". HOWEVER, S1 PARAMETER IS FIXED IN THIS USE CASE |

FIG.12

| tag | definition |
|---|---|
| X1 | |
| X2 | |
| X3 | |
| X4 | |
| X5 | |

FIG.13

| tag | r | $\theta$ |
|---|---|---|
| 1 | | |
| 2 | | |
| 3 | | |
| 4 | | |
| 5 | | |

FIG.14

| output | operation |
|---|---|
|  |  |

FIG.15

| S1 | input | init |
|---|---|---|
|  | yyy | xxx |

AUDIO OUTPUT SYSTEM, AUDIO OUTPUT METHOD, AND COMPUTER PROGRAM PRODUCT

CROSS-REFERENCE TO RELATED APPLICATIONS

This application is based upon and claims the benefit of priority from Japanese Patent Application No. 2018-026951, filed on Feb. 19, 2018, the entire contents of which are incorporated herein by reference.

FIELD

Embodiments described herein relate generally to an audio output system, an audio output method, and a computer program product.

BACKGROUND

A virtual sound imaging technology for reproducing the realistic sense of sound and voice by creating a virtual sound image has been conventionally known. For example, conventionally known is an audio guide system that achieves an audio output allowing a user to hear a sound from a particular direction even when the user moves his/her head, by detecting the movement of the head of the user and by dynamically changing the parameters of a virtual sound image system.

BRIEF DESCRIPTION OF THE DRAWINGS

FIG. 4 is a flowchart illustrating an example of an audio output method according to the embodiment;

FIG. 5 is a schematic illustrating an example of parameter information according to the embodiment;

FIG. 6 is a schematic illustrating an example of an output-data table according to the embodiment;

FIG. 7 is a schematic illustrating an example of the parameter information according to the embodiment (for Use Case 1);

FIG. 8 is a schematic illustrating an example of the parameter information according to the embodiment (for Use Case 2);

FIG. 9 is a schematic illustrating an example of the parameter information according to the embodiment (for Use Case 3);

FIG. 10 is a schematic illustrating an example of the parameter information according to the embodiment (for Use Case 4);

FIG. 11 is a schematic illustrating an example of the parameter information according to the embodiment (for Use Case 5);

FIG. 12 is a schematic illustrating an example of a parameter input I/F according to the embodiment;

FIG. 13 is a schematic illustrating an example of the parameter input I/F according to the embodiment;

FIG. 14 is a schematic illustrating an example of the parameter input I/F according to the embodiment;

FIG. 15 is a schematic illustrating an example of the parameter input I/F according to the embodiment.

DETAILED DESCRIPTION

In the conventional technology, an audio output system has been built upon hardware and software that are optimized for each specific application. Therefore, its control range and control type which are applied to the output effects of the virtual sound image have been limited by the input and output environment considered upon building the system.

Therefore, with the conventional technology, it has been impossible to implement an audio output system that can be applied to various applications through the adjustment of parameters of generalized virtual sound imaging middleware, for example. Furthermore, if the user wishes to change the usage of the audio output system after some extended use, for example, it has been impossible to implement such a change merely by changing the settings, and it has been necessary to re-build the entire audio output system every time.

An audio output system according to an embodiment are configured to have function as: a receiving unit that receives, as output-data to be output, voice data including a voice or sound data including a sound; a content identification information generating unit that generates content identification information for identifying content that is determined from the output-data; a status identification information generating unit that generates status identification information for identifying a status from at least one of sensor data and input data; a parameter information generating unit that generates parameter information used for controlling output of the output-data from the content identification information and the status identification information; and an output control unit that controls audio output of the output-data by using the parameter information.

An audio output system, an audio output method, and a computer program product according to an embodiment will now be explained in detail with reference to the appended drawings.

To begin with, an exemplary functional configuration of an audio output system 100 according to the embodiment will be explained.

Figure 1:
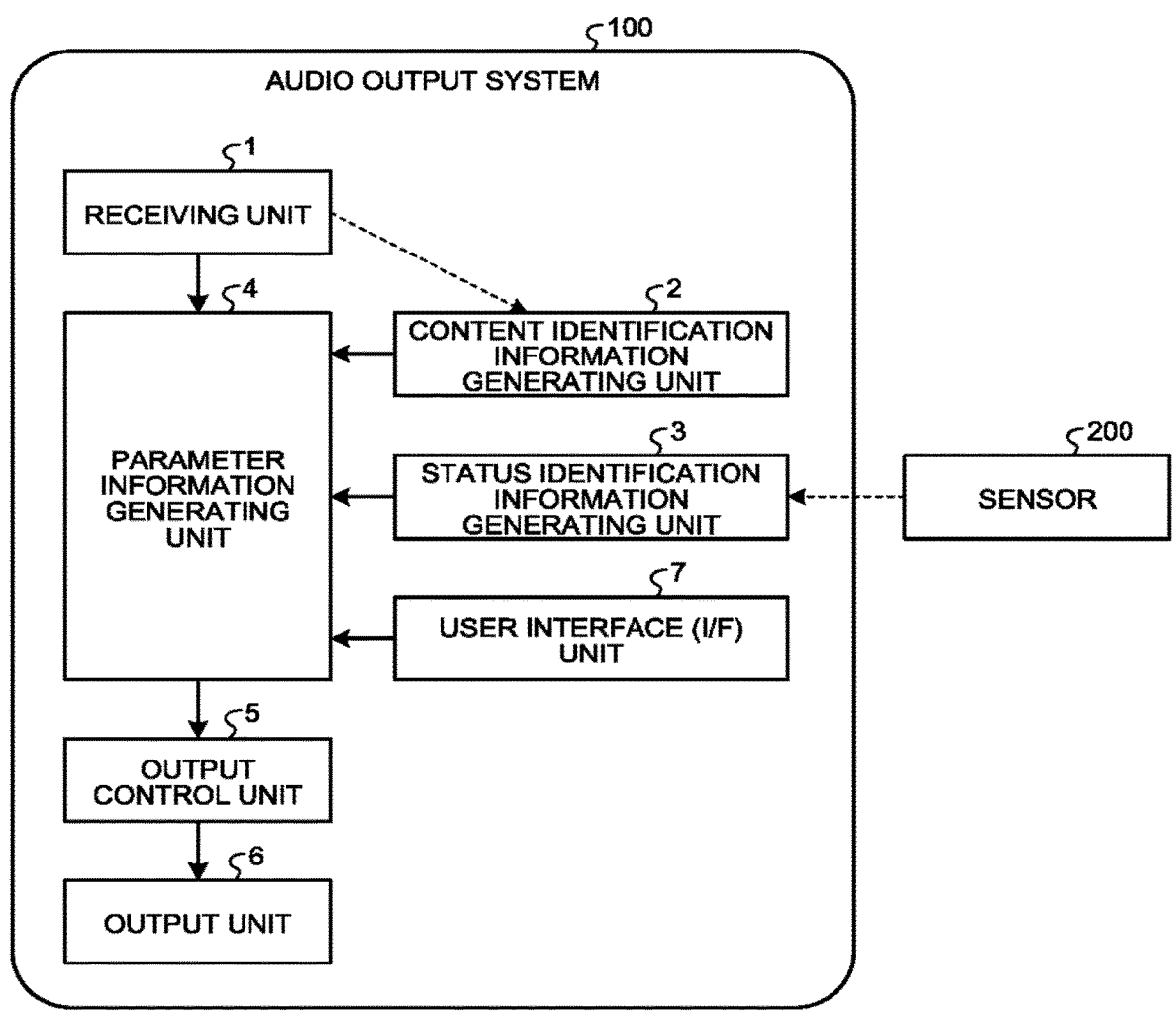
FIG. 1 is a schematic illustrating an exemplary functional configuration of an audio output system according to an embodiment.

Exemplary Functional Configuration FIG. 1 is a schematic illustrating an exemplary functional configuration of the audio output system 100 according to the embodiment. The audio output system 100 includes a receiving unit 1, a content identification information generating unit 2, a status identification information generating unit 3, a parameter information generating unit 4, an output control unit 5, an output unit 6, and a user interface (I/F) unit 7.

The functional configuration of the audio output system 100 illustrated in FIG. 1 provides one example of a combination of these elements, and it is not necessary for all of these elements to be included. Therefore, the functional configuration may be changed as appropriate depending on the application. For example, the parameter information generating unit 4 and the output control unit 5 may be implemented by one functional block.

The receiving unit 1 receives voice data including a voice, or sound data. The receiving unit 1 inputs the voice data or the sound data to the content identification information generating unit 2 and the parameter information generating unit 4. When the voice data or the sound data is being received continuously, the receiving unit 1 divides the voice data or the sound data into units in which the output (replay) is controlled, and inputs the divided units of the voice data or the sound data to the content identification information generating unit 2 and the parameter information generating unit 4.

Upon receiving the voice data or the sound data from the receiving unit 1, the content identification information generating unit 2 generates content identification information for identifying the content that is determined from the received data. Specific examples of the content will be described later. The content identification information is a content tag, for example.

The content identification information generating unit 2 inputs the content identification information to the parameter information generating unit 4.

Upon receiving sensor data detected by a sensor 200, the status identification information generating unit 3 generates status identification information for identifying a status that is determined from the sensor data. One example of the status identification information is a status tag. The sensor 200 may be any sensor. The sensor 200 is, for example, a camera that captures a video in which surrounding information around an area. The sensor 200 may be included to the audio output system 100. The status identification information generating unit may receive an input directly from a user via the user I/F unit 7, instead of receiving an input from the sensor 200.

The parameter information generating unit 4 receives the voice data or the sound data from the receiving unit 1, receives the content identification information from the content identification information generating unit 2, and receives the status identification information from the status identification information generating unit 3. The parameter information generating unit 4 then generates parameter information from received voice data (or sound data), the content identification information, and the status identification information. The parameter information is used for controlling the output of a virtual sound image. One example of the parameter information is a parameter table. Specific examples of the parameter table will be explained later in Use Cases 1 to 5. The parameter information generating unit 4 inputs the parameter information to the output control unit 5.

When the parameter information is received from the parameter information generating unit 4, the output control unit 5 controls the output of a virtual sound image, using the parameter information.

The output unit 6 outputs the virtual sound image resultant defined by the output control performed by the output control unit 5.

The user I/F unit 7 receives an operation input indicating a change in the parameter information, a change includes in at least one of a value of a parameter, a definition of the parameter, and a rule (e.g., an algorithm) for calculating the parameter, for example.

Figure 2:
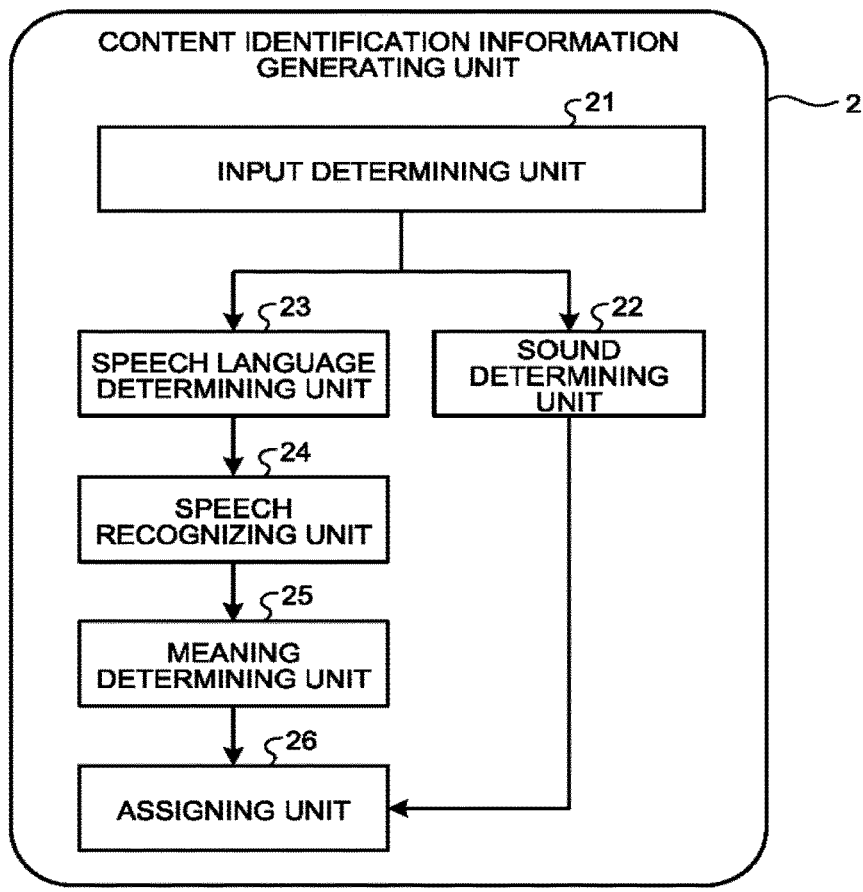
FIG. 2 is a schematic illustrating an exemplary functional configuration of a content identification information generating unit according to the embodiment.

FIG. 2 is a schematic illustrating an exemplary functional configuration of the content identification information generating unit 2 according to the embodiment. The content identification information generating unit 2 according to the embodiment includes an input determining unit 21, a sound determining unit 22, a speech language determining unit 23, a speech recognizing unit 24, a meaning determining unit 25, and an assigning unit 26.

Upon receiving output-data from the receiving unit 1, the input determining unit 21 determines the kind of the output-data. If the output-data is sound data, the input determining unit 21 inputs the sound data to the sound determining unit 22, though to the speech language determining unit 23 if the output-data is voice data.

Upon receiving sound data from the input determining unit 21, the sound determining unit 22 determines the nature of the data by a determination engine that determines "what sound the sound data is" or "what kind of meaning the sound has", for example. The sound determining unit 22 then inputs the sound determination result to the assigning unit 26.

On the other hand, the speech language determining unit 23 determines a language of speech included in voice data when it receives the voice data from the input determining unit 21. The speech language determining unit 23 then inputs the voice data and the language determination result to the speech recognizing unit 24.

Upon receiving the voice data and the language determination result from the speech language determining unit 23, the speech recognizing unit 24 performs speech recognition of the voice data, using a speech recognition engine having been switched based on the language determination result. The speech recognizing unit 24 then inputs the speech recognition result to the meaning determining unit 25.

Upon receiving the speech recognition result from the speech recognizing unit 24, the meaning determining unit 25 determines the meaning of the speech recognition result. For example, the meaning determining unit 25 determines the meaning of the speech recognition result based on the character strings included in the speech recognition result. As a more specific example, when the speech recognition result includes a predetermined keyword, the meaning determining unit 25 determines that the speech recognition result means "AAA". The meaning determining unit 25 then inputs the meaning information representing the meaning of the speech recognition result to the assigning unit 26.

Upon receiving the sound determination result from the sound determining unit 22, the assigning unit 26 assigns content identification information (e.g., a content tag) corresponding to the sound determination result, to the sound data. Upon receiving the meaning information from the meaning determining unit 25, the assigning unit 26 assigns content identification information (e.g., a content tag) corresponding to the meaning information to the voice data. The assigning unit 26 then inputs the content identification information assigned to the sound data or the voice data to the parameter information generating unit 4.

The functional configuration of the content identification information generating unit 2 illustrated in FIG. 2 provides one example of a combination of the elements, and it is not necessary for all of these elements to be included. Therefore, the functional configuration may be changed as appropriate depending on the application.

Figure 3:
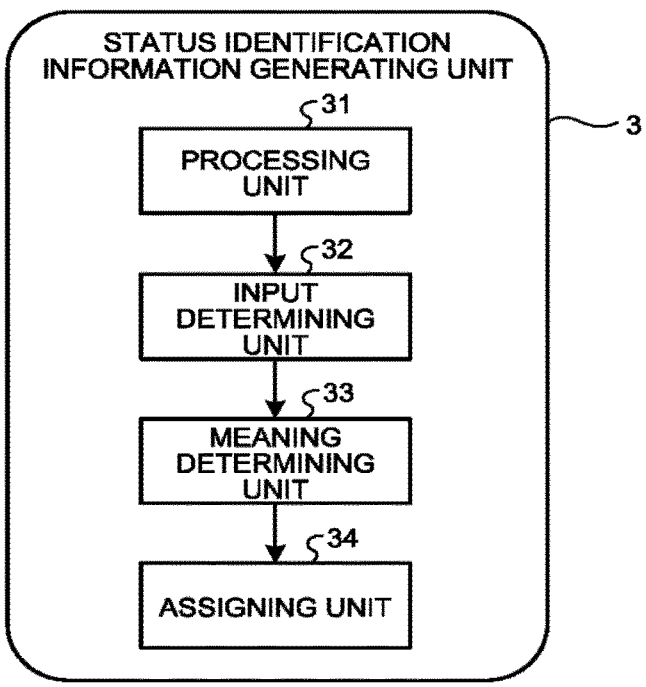
FIG. 3 is a schematic illustrating an exemplary functional configuration of a status identification information generating unit according to the embodiment.

FIG. 3 is a schematic illustrating an exemplary functional configuration of the status identification information generating unit 3 according to the embodiment.

The status identification information generating unit 3 according to the embodiment includes a processing unit 31, an input determining unit 32, a meaning determining unit 33, and an assigning unit 34.

Upon receiving sensor data from the sensor 200, the processing unit 31 processes the sensor data. The sensor data includes surrounding information around some areas, for example. This process includes, for example, a dividing process for dividing the sensor data into units corresponding to time slots from which the voice data or sound data is acquired (hereinafter referred to as "unit sensor data"). Specifically, for example, when the sensor 200 keeps capturing sensor data continuously, the processing unit 31 extracts a piece of unit sensor data as "a segment of sensor data corresponding to a particular time slot" corresponding to a piece of voice data or sound data, before executing a status determining process. In the next step, determining process is operated, for example, a process for determining which one of the statuses "someone has stopped", "someone is walking by", and "there is no one", as a particular area represents. The processing unit 31 then inputs the unit sensor data to the input determining unit 32.

Upon receiving the unit sensor data from the processing unit 31, the input determining unit 32 determines the type of the unit sensor data. Specifically, the input determining unit 32 extracts a feature value by analyzing the unit sensor data, and classifies the unit sensor data into one of groups A to C, for example, using the feature value. The input determining unit 32 inputs the classified unit sensor data to the meaning determining unit 33. The input determining unit 32 may also convert the unit sensor data to a data format that can be processed by the audio output system 100, and input it to the meaning determining unit 33, instead of the unit sensor data itself. The processing unit 31 and the input determining unit 32 described above may be configured as one functional block.

Upon receiving the unit sensor data from the input determining unit 32, the meaning determining unit 33 determines the meaning of the unit sensor data.

Specifically, the meaning determining unit 33 is implemented by a determination engine that determines that "the unit sensor data classified into the group A means that a person has stopped", for example. The meaning determining unit 33 inputs the meaning information representing the meaning of the unit sensor data to the assigning unit 26.

Upon receiving the meaning information from the meaning determining unit 33, the assigning unit 34 assigns to the unit sensor data, status identification information (e.g., a status tag) that corresponds to the meaning information. The assigning unit 34 then inputs the status identification information to the parameter information generating unit 4.

The functional configuration of the status identification information generating unit 3 illustrated in FIG. 3 provides one example of a combination of the elements, and it is not necessary for all of these elements to be included. Therefore, the functional configuration may be changed as appropriate depending on the application.

Audio Output Method

FIG. 4 is a flowchart illustrating an example of an audio output method according to the embodiment. To begin with, the receiving unit 1 receives voice data or sound data (Step S1).

The content identification information generating unit 2 then generates content identification information that is assigned to the voice data or the sound data (Step S2). Specifically, the content identification information generating unit 2 recognizes the voice data or the sound data by operating the functional blocks illustrated in FIG. 2, and determines the meaning of the data. The content identification information generating unit 2 then generates a content tag, corresponding to the meaning of the voice data or the sound data.

The parameter information generating unit 4 then performs a parameter information generating step 1 for generating parameter information based on the result of the process at Step S2 (Step S3).

The parameter information is, for example, a parameter table that determines the conditions for outputting (replaying) the voice data or the sound data. The parameter table is a set of one or more parameters including at least one of a constant and a variable. The parameter table is linked to the piece of output (replayed) data. The output-data is raw data (voice data or sound data) to be output. The output control unit 5 performs output control of the output-data based on the output conditions designated by a combination of parameter values included in the parameter table.

FIG. 5 is a schematic illustrating an example of parameter information according to the embodiment. In the example illustrated in FIG. 5, the parameter information is stored as the parameter table. In this example, the parameter table includes "time" indicating the acquisition time (h/m/s), "ID" indicating data ID, "D" indicating a data type, "N" indicating the currency of data, "content" indicating a content classification, "S1" indicating a status 1 (status), "num" indicating a status 2 (replay count), "R1" indicating a repetition control 1, "R2" indicating a repetition control 2, "Xi" to "Xiv" representing a tag appended to the content, "1" to "4" linking a tag to an output condition, and "out" indicating an output control, as parameters. An example of the output-data is a piece of voice data including a voice message such as "*** is ###.

The parameter information generating step 1 illustrated in FIG. 4 will now be explained in detail. The parameter information generating unit 4 sets the time (time stamp) when voice data or the sound data is received in the process at Step S1, to the "time" parameter, and sets the identification number allocated (e.g., an automatically generated identification number) when the input data is received in the process at Step S1, to the ID parameter Also, the parameter information generating unit 4 sets the content tag generated in the process at Step S2 to the "content" parameter. If the value of the "time" parameter is the maximum value (latest) at that point in time, the parameter information generating unit 4 sets η (latest) to the N parameter. If the value of the "time" parameter is not the maximum value at that point in time (latest), δ (others) is set.

The D parameter indicating a data processing type is set by a user of the audio output system 100 in advance. The D parameter is referred to in a process of setting the R1 parameter.

The parameter information generating step 1 is as described above. The parameter information generating unit 4 also writes the "time" parameter and the ID parameter to an output-data table in the temporal order, at the same time as the parameter information generating step 1 is performed.

FIG. 6 is a schematic illustrating an example of the output-data table according to the embodiment. The output (replay) data table includes the "time" parameter indicating the acquisition time (h/m/s) and the ID parameter indicating the data ID. The "time" parameter and the ID parameter correspond to the "time" parameter and ID parameter respectively, included in the parameter table illustrated in FIG. 5. The output-data table includes the output of which is currently being controlled.

The overall process of a parameter information generating step 2 illustrated in FIG. 4 will now be explained. After the parameter information generating step 1 is finished, the status identification information generating unit 3 generates status identification information from the sensor data detected by the sensor 200 or the like (Step S4). The status identification information generating unit 3 generates, a status tag for identifying the status determined from the sensor data by operating the functional block illustrated in FIG. 3 in accordance with the sensor data and a predefined rule.

The parameter information generating unit 4 then performs the parameter information generating step 2 for generating (updating) the parameter information based on the status identification information generated in the process at Step S4 (Step S5).

The parameter information generating step 2 will now be explained in detail. The parameter information generating unit 4 sets the status tag generated in the process at Step S4 to the S1 parameter.

The parameter information generating unit 4 then performs a parameter information generating step 3 (step S6) for generating (updating) the parameter information based on the parameters set in the processes up to the parameter information generating step 2.

The parameter information generating step 3 will now be explained in detail. The parameter information generating unit 4 sets the "num" parameter indicating the status 2 (replay count), the R1 parameter indicating the repetition control 1, the R2 parameter indicating the repetition control 2, the parameters (Xi to Xiv) representing the tags appended to the content, the parameters (1 to 4) linking the tags to output conditions, and the "out" parameter indicating an output control.

The R1 parameter indicating the repetition control 1, and the R2 parameter indicating the repetition control 2 are set (determined) based on a rule that controls the number of times the output-data is to be output. An example of the rule is a predefined algorithm defined by a user.

The "out" parameter indicates whether it is necessary to output the output-data (out=1; output, out=0; no output). The "num" parameter and the R2 parameter are auxiliary variables for controlling the output of the output-data.

Through the three parameter information generating steps 1 to 3 (Steps S3, S5, and S6) described above, the entire values of the parameters which is required in a series of operations for outputting the sound/voice is calculated and updated in the parameter table.

If the "out" parameter is 1, the output control unit 5 outputs the output-data under the output condition identified by the parameter table (Step S7). If the "out" parameter is 0, the output control unit 5 does not output the output-data (Step S8).

The output control unit 5 determines whether to repeat outputting the output-data by referring to the R1 parameter and the R2 parameter (Step S9).

The R1 parameter is calculated from the D parameter indicating the data processing type (a flow type $\phi$ or a log type $\zeta$), and the value of the data currency N. The R1 parameter takes a value of either 1 or 0.

If R1=0, the output control unit 5 deletes the pair of the "time" parameter and the ID parameter corresponding to that output-data from the output-data table, and ends the sequence of controlling the output of the output-data (Step S10). If the process for controlling the output of the output-data is ended, the audio output system 100 waits until the next piece of output-data is received.

If R1=1, the output control unit 5 calculates the R2 parameter. The formula for calculating the R2 parameter is defined by a user, in advance, in the parameter table. The formula for calculating the R2 parameter contains variables that vary depending on situation, e.g., depending on the S1 parameter (status tag) and the "content" parameter (content tag). If R2=0, the control is shifted to the process at Step S10, in the same manner as when R1=0 is established, as described above.

If R2=1, the control returns to the process at Step S5 (the parameter information generating step 2) described above. In this manner, the output control process sequence is repeated, and the process is looped until R1=0 or R2=0 is established as a result of changing the value of the S1 parameter (status tag), or receiving an input of output-data that is newly input, for example.

Explained below are some specific examples of settings of the parameter information and operation of the audio output system 100 when the audio output system 100 is applied to some use cases. The audio output method explained in each of these use cases is merely an example, and the definitions of data, the number of variables, and the like used in each of these use cases may be changed as appropriate.

Use Case 1

Explained in Use Case 1 is an example in which the audio output system 100 is used in assisting communication among employees at a field work. The use case explained herein is, as an example, application of the audio output system 100 used by employees working in an inn to improve the efficiency of their work. Assumed herein is a situation in which, in order to improve the guest satisfaction and to provide high-quality services, the employees who are assigned with tasks use some communication tool to enable them to complete their tasks efficiently by exchanging information, such as guests details, orally with one another. The orally exchanged information includes those related to the guest rooms, the kitchen, the front desk, and directed to the entire employees, and so on. Therefore, the significance of each orally exchanged massage varies depending on the responsibility of the employees (e.g., information some employees do not need to listen may be necessary for other, someone nay need to listen the massage repeatedly).

FIG. 7 is a schematic illustrating an example of the parameter information according to the embodiment (for Use Case 1). In the example illustrated in FIG. 7, the parameter information is stored as a parameter table.

To begin with, in the parameter information generating step 1, the parameter information generating unit 4 sets the time (time stamp) when the output-data is received to the "time" parameter, and sets the identification number allocated upon the receipt of the output-data to the ID parameter. The parameter information generating unit 4 also stores the "time" parameter and the ID parameter in the output-data table (see FIG. 6).

In Use Case 1, there is a possibility of output-data being output repeatedly until the task is completed. Therefore, the D parameter indicating the data processing type is set with a log type ($\zeta$) in advance. Furthermore, the parameter information generating unit 4 refers to the output-data table, and if the value of the "time" parameter has a maximum value among those in the list of the table, the parameter information generating unit 4 sets the latest ($\xi$) to the N parameter indicating the data currency. If there is another latest data in the table, the parameter information generating unit 4 sets others ($\delta$) to the N parameter.

The parameter information generating unit 4 then sets the content tag generated based on the content of the output-data to the "content" parameter. In FIG. 7, the content tag is set depending on the task to which the content of the output-data is directed. In this example, a content tag X1 is identification information linked to the content directed to the room service personnel. The content for the room service personnel is voice data such as "Please clean up the room". A content tag X2 is identification information linked to the content directed to the kitchen. The content directed to the kitchen is voice data such as "The guest in the room number 8 has a buckwheat allergy". A content tag X3 is identification information linked to the content directed to the front desk. The example of content directed to the front desk is voice data such as "The guest in the room number 8 wants to know the transportation to a nearby art museum". A content tag X4 is identification information linked to the content directed to the entire employees. The content directed to the entire employees is, like as, voice data "We are expecting a crowd of guests tomorrow because the room reservations are full".

In the example illustrated in FIG. 7, because the output-data is "Please finish cleaning the room number 7 by nine", the content tag of the output-data is set to X1.

The parameter information generating step 2 will now be explained. First, the sensor 200 detects the completion of cleaning. If the sensor 200 has not observed any sign of completion, the parameter information generating unit 4 sets ξ which indicates requiring an attention to the S1 parameter that shows the status 1 (status).

There are two types of repetition control variables, the R1 parameter and the R2 parameter. The R1 parameter is set to 1 or 0, in accordance with a general-purpose calculation formula that uses the D parameter and the N parameter. Here, because the data processing type is the flow type φ and the data currency is η (latest), R1=1.

The calculation rule for the R2 parameter is set by a user in advance. In the example illustrated in FIG. 7, the calculation rule is set in such a manner that, if the parameter S1 indicating the status 1 (status tag) is ξ (requiring attention), the output-data is output repeatedly, R2.=1 If S1=Ψ (task completed) or λ (for sharing information only), the output-data is replayed once, and the output is ended without repeating, R2=0.

The conditions for outputting the virtual sound images are defined by the user in advance on the parameter table. Those conditions are designated by using the parameters (X1 to X4) representing the tags appended to the content, and the other parameters (1 to 4) linking the tags to the output conditions. In the case illustrated in FIG. 7, if the content tag is X1, the tag is set to a value 1. Then user defines the rule as below, if the tag is set to the value 1, the data is set to be replayed as if the output-data is coming from a sound source at a distance $r_a$ and direction with an angle of 135 degrees with respect to the front side of the user (corresponding to a diagonally right rear side). The perceived distance $r_a$ between the ear and the sound source may be constant or variable. Even if the perceived distance $r_a$ currently in use is constant, the parameter indicating the perceived distance $r_a$ may be enabled to include a variable. With such a configuration, it is possible to support an application that requires control of the perceived distance at which the output-data is replayed, in the future.

The parameter information generating step 3 will now be explained. The parameter determined at the parameter information generating step 3 is the "out" parameter indicating an output control. In the case illustrated in FIG. 7, the data is output if any one of the following output conditions (1) and (2) is satisfied, that is to say, out=1.

(1) "the content of the information is directed to the room service personnel (X1) or to the entire employees (X4)", and "replay count num=0"; or (2) "the content of the information is directed to the room service personnel (X1) or to the entire employees (X4)", and "replay count "num" is equal to or greater than one, and the status tag S1 is set to requiring attention (ξ).

If none of the output conditions (1) and (2) are satisfied, the output-data is not output (out=0).

In other words, in the exemplary parameter table illustrated in FIG. 7, among various types of voice data generated in real-time, only the information necessary for the room service personnel is selected and output (replayed). When the status tag S1 is set to requiring attention (ξ), the output-data is output repeatedly until someone completes the task and the status tag is switched from the requiring attention (ξ) to the task completed (Ψ).

After executing the output control of the output-data (to output/not to output) in accordance with the output condition designated in the parameter table, the control refers to the R1 parameter and to R2 parameter. At this time of Use Case 1, the R1 parameter is always 1, as described earlier. The R2 parameter is set to 1 because the S1 parameter indicating the status 1 (status) (status tag) is ξ in the parameter table. Therefore, a repeating sequence is started, and the process is started again from the parameter information generating step 2, as illustrated in the flowchart in FIG. 4. Once the latest status is observed and the S1 parameter is updated from the requiring attention (ξ) to the task completed (Ψ) at the parameter information generating step 2, the repeating sequence is ended.

By performing the process illustrated in the flowchart in FIG. 4 using the parameter table illustrated in FIG. 7, it is possible to implement a desirable operation that required in the completion of responsible tasks, of selecting the voice data or the sound data, and outputting (replaying) the voice data or the sound data from a direction associated with the content.

Use Case 2

Explained in Use Case 2 is an example in which the audio output system 100 is applied to the output control of a sound source in a facility. The "facility" in Use Case 2 generally means "a place that has limited and defined area and can be distinguished from other areas", such as the inside of a train, a commercial facility, a government office, or a station. In Use Case 2, the facility does not include places the area of which is not defined, e.g., a public road. Considered herein is an example in which a sound or a voice to be output is only output, and there is no requirement for any particular process intended by the sound source owner (e.g., for delivering the sound or the voice to specific end users within the area). When the facility is a train, for example, the sound source owner is a railway company. In this case, the end users are passengers of the train.

FIG. 8 is a schematic illustrating an example of the parameter information according to the embodiment (for Use Case 2). In FIG. 8, the parameter information is stored as the parameter table. Here, FIG. 8 illustrates a parameter table used in the application for addressing the passengers with necessary information that is limited to the name of stations, among the pieces of information delivered as announcements on a train or at a platform of a train station, for example. Generally, when a train is approaching a next stop, the name of the station is announced inside of the train. When the train stops at the platform of the station, the passengers on the train can also hear the name of the station announced at the platform of the station. Train announcements are also made when an accident, a delay, or the like occurs. Such announcements are addressed to the entire passengers on the train, and are basically kept being replayed, without "any announcement processing fitted to the passengers". However there are demands that the passengers do not want to miss any information that is directly related to the station they are getting off, and wants to receive the information in a fashion easy for them to listen to. In order to perform a process addressing such demands, the parameter table is set as illustrated in FIG. 8, for example.

In Use Case 2, it is assumed that the users are wearing an open-ear type earphone device (an open-ear type earphone with a microphone in Use Case 2), and detecting sound of the train announcements via the microphone on that earphone. In other words, in Use Case 2, the audio output system 100 is implemented by applying an open-ear type earphone with a microphone. It is also possible to realize the audio output system 100 by operating some functions included in the functional configuration of the audio output system 100 with an external server device or a smart device, and allowing the open-ear type earphone with a microphone to communicate with the server device or the smart device.

Objectives of the end users (passengers) in Use Case 2 are to get off without rushing, not to miss the station they are to get off, and, if their destinations are still somewhat distant, to relax without paying much attention to the train announcements. Therefore, there are demands of the end users, they do not want to miss any information informing that the train is approaching a stop previous to their destination or approaching the destination, but there is no problem even if they miss the names of the stations being announced while the train is passing the other areas.

There is also a demand that, while the end users need to listen to other information such as information related to an accident provided by train announcements, with a manner distinguished from the information of the name of the stations, the latter of which has associated with the current location of the train.

Explained now is an example realizing such demands using the parameter table illustrated in FIG. 8. In Use Case 2, for a passenger who is taking a train on a line A, and wants to get off at B station, a train announcement is to be replayed upon arrival at the previous C station, and the voice of such train announcement is to be output as the output-data.

First, as the parameter information generating step 1, the parameter information generating unit 4 sets the time (time stamp) at which the output-data is received to the "time" parameter, and sets the identification number allocated upon the receipt of the output-data to the ID parameter. The parameter information generating unit 4 also stores the "time" parameter and the ID parameter in the output-data table (see FIG. 6).

In Use Case 2, because the latest information is kept being received as the output-data, the D parameter indicating the data processing type is set to the flow type ($\phi$), and the N parameter indicating the data currency is set to the latest ($\eta$) by default in advance.

The parameter information generating unit 4 then sets a content tag generated based on the content of the output-data to the "content" parameter. In the case illustrated in FIG. 8, the output-data is voice data representing a train announcement, e.g., "We will be arriving at C station soon". In the application in which the audio output system 100 is used, the end user (passenger) enters the line he/she is taking, and the name of the station at which the user wants to get off (e.g., "B station"). Therefore, it can be determined that "C station" is "a station previous" to "B station" where the user is planning to get off. Hence, if the output-data is voice data containing "C station", X1 indicating the name of the previous station is set to the "content" parameter (content tag) of the output-data.

The parameter information generating step 2 will now be explained. In FIG. 8, a target to be detected is "the name of the station included in an announcement made while the train is at the platform of a station, or when the train has approached to the platform of the station by a certain distance or less". Therefore the S1 parameter indicating the status 1 is set with one of the status tag "within the station area or the distance $\Omega$" ($\xi$) or the others ($\Psi$). This is for preventing from picking up, "C station" when a train announcement such as "an emergency stop button has been pushed at C station, so we are currently checking for the safety" is made at a location completely away from the "C station". In FIG. 8, the current position, which is to be set in the status S1, is determined as "within the station area or the distance $\Omega$" ($\xi$) based on the sensor data received from the sensor 200 or based on the surrounding information acquired from other input data, and $\xi$ is set to the S1 parameter.

As the R1, parameter indicating the repetition control variable is 1, because D=$\phi$ and N=$\eta$, as mentioned above, in FIG. 8, the R1 parameter is always 1.

The rule for calculating the R2 parameter is set by the end user (passenger) in advance. In the case of FIG. 8, the calculation rule is defined in such a manner that R2=1 if the number of times by which the replay of the output-data is repeated is 0 or 1, and if others (if the output-data has already been replayed twice), R2=0 and the control goes out of the output control loop.

The conditions for outputting the virtual sound images corresponding to the content of the output-data are defined by an end user (passenger) or the user (railway company) in advance in the parameter table. The conditions for outputting the virtual sound images are designated using the parameters (X1 to X3) representing the tags appended to the content, and the parameters (1 to 3) linking the tags to output conditions. For example, defined condition shown in FIG. 8 is, if the content tag is X1, the tag is set to a value 1, and, if the tag is set to the value 1, the output-data is replayed in such a manner as if the output-data is coming from the source at the distance $r_a$ at an angle of 90 degrees with respect to the front side of the end user (on the right side). Also defined is a condition that, if the content tag is X2, the tag is set to a value 2, and, if the tag is set to the value 2, the output-data is replayed in such a manner as if the output-data is coming from the source at the distance $r_a$ at an angle of 235 degrees (from the rear left) with respect to the front side of the end user. Also defined is a condition that, if the content tag is X3, the tag is set to a value 3, and, if the tag is set to the value 3, the output-data is replayed in such a manner as if the output-data is coming from the source at the distance $r_a$ at an angle of 0 degrees (from the front side of the end user).

The parameter information generating step 3 will now be explained. The parameter determined at the parameter information generating step 3 is the "out" parameter indicating an output control. In the example illustrated in FIG. 8, the output-data is output (out=1) if the following output condition (1) is satisfied.

(1) The "content tag has the name of the previous station (X1) or the name of the station (X2)", and the "current position is within the station area or the distance $\Omega$ ($\xi$)". The output-data will be output once more, if the "replay count num=0 or 1" in the repetition control which will be described later, because the R2 parameter indicating the repetition control 2 will then be set to 1.

If the output condition (1) is not satisfied, the output-data is not output (out=0). For example, if the "content" parameter (content tag) is X3 (other than station names), or if the S1 parameter is Ψ (other than "within the station area or the distance Ψ"), the output-data is not output (out=0). This, however, does not mean that the end user who is a passenger is not capable of listening to the ordinary train announcements. It should be noted that the users receive the voice included in the ordinary train announcements through their ears, because assumed in Use Case 2 is the use of an open-ear type earphone device, and only the output-data with the out=1 is replayed in an emphasized manner near the ears via the device. In other words, this use case is an example of one application in which a train announcement or a guidance announcement at the platform is replayed near the ears of the end user in an emphasized manner when the train approaches or arrives at "the station where the user is to get off", or "the station previous to the station where the user is to get off", which are different depending on the user, among the voices included in various types of train announcements.

Through the sequence described above, after executing the output control of the output-data (to output/not to output) in accordance with the output condition designated in the parameter table, the control refers to the R1 parameter, and to R2 parameter. At this time, in Use Case 2, the R1 parameter is always 1, as described earlier. If num=0 or 1, the R2 parameter is set to R2=1. Therefore, after incrementing num=num+1, the repeating sequence is started, and the process is started again from the parameter information generating step 2. If num>1 is established when the R2 parameter is calculated next time, the repeating sequence is ended. The data linked to the output-data (the ID parameter and "time" parameter pair) is then deleted from the output-data table when the repeating sequence is ended, and the control waits for an input of the next output-data.

Use Case 3

In Use Case 3, an example in which the audio output system 100 is applied to the output control of a sound source in a facility will now be explained. The "facility" in Use Case 3 means any environment with a demand for communicating information selectively to a particular person in "an area that is partitioned and can be distinguished from other areas" such as a commercial facility, a government office, an art museum, a museum and so on.

FIG. 9 is a schematic illustrating an example of the parameter information according to the embodiment (for Use Case 3). In this case shown in FIG. 9, the parameter information is stored as the parameter table. Here, FIG. 9 provides an example of the parameter table for controlling the output (replay) of audio guide information for the exhibitions in a museum, as an example.

In Use Case 3, the content of voice data is recorded and prepared in advance, instead of being generated in real-time. The audio output system 100 performs a control process for replaying the voice information when the viewer stops in front of an exhibition, and not replaying the information when the viewer passes by. With this control process, the audio guide not replayed for an uninterested visitor who is just walking by so that the visitor is not forced to listen thereto. Furthermore, when a plurality of viewers become attracted to and stop in front of the same exhibition, the audio output system 100 replays the guide individually, at their respective timing. In this manner, the museum operating organization who is the information owner can provide audio guide information effectively, by ensuring the convenience of the viewers.

In Use Case 3, the output-data includes one or more pieces of voice data that are prepared for the respective exhibitions. Therefore, fixed values are set to the "time" parameter indicating the acquisition time, and to the ID parameter indicating the data ID. The log type (ζ) is set to the D parameter indicating the data processing type, because the output-data is replayed repetitively. The N parameter indicating the currency of the data has no meaning in the example of Use Case 3, so any value may be assigned thereto. Therefore, the value of the N parameter is fixed to η, as an example.

In Use Case 3, the "content" parameter (content tag) is assigned in advance based on the content of the voice data. In the example illustrated in FIG. 9, X1 is assigned to the title and the characteristics of an exhibition in the museum, and X2 is assigned to an explanation of the era in which the piece is made, or of the background of the creator. X3 is designated to other supplementary information or sound effect. Therefore, in Use Case 3, the parameter information generating step 1 is completed in advance, and, when a viewer goes into the exhibition room for the first time, the parameter table having been already input with the parameters, as well as the pieces of voice data, are downloaded to the terminal of the viewer. The viewer terminal is a smart device operating with an open-ear type earphone device (open-ear type earphone speaker, in Use Case 3), for example. In Use Case 3, the audio output system 100 selects a user's open-ear type earphone speaker to which the output-data is to be output based on the condition of the viewer, and outputs the audio guide information to the selected open-ear type earphone speaker.

The parameter information generating step 2 will now be explained. In Use Case 3, the dynamic inputs of the parameters to the parameter table always starts from the parameter information generating step 2. At the parameter information generation step 2, the S1 parameter indicating the status 1 is set based on the sensor data detected by the sensor 200. In Use Case 3, the sensor 200 installed near the exhibition detects some data as to whether the viewer has stopped in front of the exhibition, is just walking by, or there is nobody there. The parameter information generating unit 4 then sets a status tag indicating the condition measured by the sensor 200 to the S1 parameter. In the example of the parameter table illustrated in FIG. 9, ξ indicating the condition of the viewer having stopped is set to the S1 parameter.

Any method may be used to detect the condition of the viewer. For example, the condition of the viewer is detected based on whether the device (e.g., open-ear type earphone speaker) worn by the viewer who is the end user of the audio output system 100 has been receiving the signal emitted from the sensor 200 near the exhibition for a period equal to or longer than a certain time period. In Use Case 3, the same voice data has been prepared by the sound source owner (the museum in Use Case 3) for each viewer. When the viewer who is an end user starts the application on the terminal carried by the user in the museum, the parameter table is downloaded to the application. The value of the S1 parameter in the parameter table is set based on the movement of the corresponding end user (e.g., has stopped or walking by).

Because D=ξ as described earlier, the R1 parameter indicating the repetition control variable 1 is always 1 in the example illustrated in FIG. 9.

Furthermore, as to the rule for calculating the R2 parameter, there is no chance of repeating the explanation of the same exhibition twice to the same end user (viewer).

Therefore, in the example illustrated in FIG. 9, the repetition is enabled (R2=1) only if num=0, and the repetition is disabled (R2=0) if "num" is 1 or greater. In this manner, it is possible to implement a control for avoiding replaying the same audio guide many times in a situation in which a viewer comes back to look at the same exhibition the user has already looked more carefully, for example. It is also possible for the viewer to replay the same audio guide again intentionally, by giving an instruction to the terminal.

The content tags, that is, the conditions for outputting the virtual sound images corresponding to the content of the output-data are defined by the user (museum) in advance in the parameter table. These conditions are designated using the parameters (X1 to X4) representing the tags appended to the content, and the parameters (1 to 4) linking the tags to the output conditions. For example, FIG. 9 shows that the conditions are set in such a manner that the viewer who is standing in front of the exhibition perceives the voice data as if the voice data is from three different directions (at angles of 45 degrees, 225 degrees, and 270 degrees) depending on the content of the explanations.

The parameter information generating step 3 will now be explained. The parameter determined at the parameter information generating step 3 is the "out" parameter indicating an output control. In the example illustrated in FIG. 9, the output-data is output (out=1) if the following output condition (1) is satisfied.

(1) "The replay count num=0, and the viewer is standing in front of the exhibition (S1=ξ)"

If the output condition (1) is not satisfied, the output-data is not output (out=0). Therefore, the audio guide is replayed only once for the viewer who has become interested in the exhibition. Furthermore, as described earlier, once it is determined that the output-data is to be output, that is, out=1 is set, the "num" parameter indicating the replay count is incremented by +1. In this manner, even if there are some viewers who come back to see the same exhibition several times, it is possible to avoid a situation in which the same guidance is replayed repeatedly every time the users stop in front of the exhibition.

Furthermore, in Use Case 3, individual values are updated in the parameter table having been downloaded to a smart device operating with the open-ear type earphone device of each viewer. Therefore, even if a plurality of viewers stop in front of the same exhibition, each of such viewers can listen to the audio guide via the open-ear type earphone device with no sound leakage, at the timing at which the viewer has stopped. In this manner, it is possible to prevent an audio guide that is output for a particular viewer from distracting the other viewers near the viewer who is appreciating the exhibition.

Through the sequence described above, after executing the output control of the output-data (to output/not to output) in accordance with the output condition designated in the parameter table, the control refers to the R1 parameter and to R2 parameter. At this time, in Use Case 3, the R1 parameter is always 1, as described earlier. The R2 parameter is 1 only if num=0. Therefore, in practice, num=num+1>=1 is established once the output-data has been output (replayed) even one time. Hence, the repeating sequence is ended. The data (the ID parameter and "time" parameter pair) linked to the output-data is deleted from the output-data table, and the control waits for an input of the next output-data. Specifically, for example, when the viewer enters another exhibition room for the first time, the audio guides for the exhibitions inside the room are downloaded to the terminal (e.g., smart device) of the viewer. When the R2 parameter is set to 1, the output control sequence illustrated in FIG. 4 is started again from the parameter information generating step 2. If num>=1 in the subsequent calculation of the R2 parameter, the control goes out of the output control sequence illustrated in FIG. 4, and the control waits for an input of the next output-data.

In Use Case 3, the output control unit 5 may execute the output control for a set of data including plural pieces of output-data (sound data or voice data) by using one status parameter. In such a configuration, it is possible to control the direction and the distance at which the virtual sound image corresponding to each piece of the output-data included in a data set is output, by using the parameter table that is linked to the output-data.

For example, to replay a series of conversations exchanged among persons A, B, and C (where the conversations are pre-recorded voice data), the voice data of the series of conversations is handled as one data set when a viewer walks by in front of an exhibition. Therefore, the status (ξ: e.g., "viewer has stopped in front of the exhibition"), which is set to the S1 parameter indicating the status 1, and the value set to the "num" parameter, which indicates the status 2 (replay count), are set for each data set. When S1=ξ, therefore, each piece of output-data included in the data set are all output. In this case, it is possible to control the outputs of the virtual sound images in such a manner that the viewer perceives the voice of the person A as if the voice is coming from the right side, the voice of the person B as if the voice is coming from the left side, and the voice of the person C as if the voice is coming from the immediately rear side of the viewer, by using the parameter table linked to each of such pieces of output-data (see FIG. 9).

Use Case 4

Explained in Use Case 4 is an example in which the audio output system 100 is applied to the control of outputs of simultaneous interpretations and real-time audio guides of a theatrical performance. In other words, explained in Use Case 4 is an example in which the user can receive information that is being provided in real-time as voice data, in a form that the user likes, by switching the setting on the site of each terminal. Each user is permitted to change settings such as to receive/not to receive the voice data at any time, even after the voice data has started being provided.

FIG. 10 is a schematic illustrating an example of the parameter information according to the embodiment (for Use Case 4). As shown in FIG. 10, the parameter information is stored as the parameter table. Specifically, FIG. 10 provides an example of the parameter table in which the audio output system 100 is applied to a simultaneous interpretation system for a theatrical performance. In Use Case 4, there are piece of voice data in a plurality of languages. The language used in the voice data varies depending on the program of the performance and the speakers. Considered in Use Case 4 is a demand of an end user who is an audience of the theater, and who wants to understand the content in real-time using a translation in a language that the end user prefers, while listening to the voice in the original language, in addition to the translation result, at the same time. To address such a demand, the audio output system 100 according to the embodiment can be used to change the direction from which the voice data is perceived as coming, depending on the language used in the voice data. In this manner, the user can discern individual pieces of voice data. Furthermore, the convenience for the user is further improved by allowing the user to switch on and off a function on the user's terminal when the user no longer requires the translation of the speeches, or wants to turn off the voice in the original language, for example.

In Use Case 4, as a sentence which is spoken by a speaker (e.g., a performer speaking a line), the organizer of the performance transmits a piece of voice data based on the spoken sentence over a plurality of channels. Examples of the output-data include voice data of the original voice and translation voice data. The translation voice data contains a translation voice resultant of real-time translation performed by a simultaneous translation engine, and spoken in another language. An end user who is an audience of the theater selects a channel that the end user likes, from a plurality of channels, and listens to the voice included in the output-data via an open-ear type device (an open-ear type earphone with a microphone in Use Case 4).

The audience starts the application on the terminal (e.g., the smart device carried by the user) before the performance starts. The parameter table and the output-data table having been input with the initial values are downloaded to the terminal. The application is at standby, enabled to readily start its operation when any piece of output-data is received. As an example, it is assumed herein that a play is being performed in Japanese, and English and German have been prepared as translation languages. Explained in Use Case 4 is a specific example in which an audience designates to receive voice in German, via the user I/F unit 7 on the terminal the audience has at hand.

To begin with, as the parameter information generating step 1, the parameter information generating unit 4 sets the time (time stamp) at which the output-data is received to the "time" parameter, and sets the identification number allocated upon the receipt of the output-data to the ID parameter. The parameter information generating unit 4 also stores the "time" parameter and the ID parameter in the output-data table (see FIG. 6).

In Use Case 4, because the latest information is kept being received as the output-data, the D parameter indicating the data processing type is set with the flow type ($\phi$), and the N parameter indicating the data currency is set with the latest ($\eta$), by default in advance.

Subsequently, the parameter information generating unit 4 sets the content tag generated based on the content of the output-data to the "content" parameter. In the example illustrated in FIG. 10, because the user has already designated to receive German, the output-data will be voice data in German. Therefore, in this example, the "content" parameter is always set to German (X3).

Explained in the example illustrated in FIG. 10 is an example in which the user selects to receive only the voice data in German, but the parameter table may also be configured to receive the voice data in all languages, and to control to output or not to output each language using the "out" parameter that is used for controlling the output. The control with the parameter table is also advantageous in that the control method can be adjusted based on the actual usage, considering the processing power of the device to be used.

The parameter information generating step 2 will now be explained. In the example illustrated in FIG. 10, the S1 parameter indicating the status 1 is set to $\xi$ indicating that the translated voice is enabled (on), via input data that is made by the user operation via the user I/F unit 7 on the terminal.

As to the R1 parameter indicating the repetition control variable 1, because D=$\phi$ and N=$\eta$ as mentioned above, the R1 parameter is always 1 in the example illustrated in FIG. 10.

Furthermore, the rule for calculating the R2 parameter is set by the end user (audience) in advance. In the example illustrated in FIG. 10, because no audience listens to the lines of a play being currently performed repeatedly, the R2 parameter is set (designated) with a fixed value 0 in advance.

In Use Case 4, the content tags, that is, the conditions for outputting the virtual sound image are defined by a user who belongs to the information owner (the organizer of the performance) in advance, in the parameter table, in order to avoid cumbersomeness of the settings. The conditions for outputting the virtual sound images are designated using the parameters (X1 to X4) representing the tags appended to the content, and the parameters (1 to 4) linking the tags to the output conditions. Therefore, in the parameter table having been downloaded onto the terminal by the audience who is the end user, the parameters (X1 to X4) representing the tags appended to content, and the parameters (1 to 4) linking the tags to output conditions have already been input with fixed values. In the example illustrated in FIG. 10, the conditions for outputting the virtual sound images are set so that the end user perceives the translated voice as coming from a designated direction, e.g., English from a direction at 135 degrees, and perceives German from a direction at 225 degrees, with respect to the front side of the stage.

The parameter information generating step 3 will now be explained. The parameter determined at the parameter information generating step 3 is the "out" parameter indicating an output control. In the example illustrated in FIG. 10, the output-data is output (out=1) if the following output condition (1) is satisfied.

(1) "The replay count num=0", and the "translated voice is on (S1=$\xi$)."

In the example illustrated in FIG. 10, if the output-data has been output (replayed) once, num>0 is established. Therefore, out=0. Furthermore, the R2 parameter is fixed to the value of 0. Therefore, the repeating sequence is not executed. Once the output-data is output one time, the data (the ID parameter and "time" parameter pair) linked to the output-data is deleted from the output-data table, and the control waits for an input of the next output-data.

In Use Case 4, too, it does not mean that the end user (audience) cannot directly listen to the ordinary real voice. In Use Case 4, the end user uses an open-ear type earphone device, and the output-data for which out=1 is set as output (replayed) in an emphasized manner near the ears via the device. The user also hears the ordinary voices spoken by the theater performers. The S1 parameter can be changed at any time by the user making an operation input. Therefore, when the user wants to listen to the real voice without listening to the translation voice, the user can turn off replaying the translated voice easily while the user is watching the play, by making an operation input for changing the setting via the user I/F unit 7 on the open-ear type earphone device.

Through the sequence described above, after executing the output control of the output-data (to output/not to output) in accordance with the output condition designated in the parameter table, the control refers to the R1 parameter, and to R2 parameter. At this time, in Use Case 4, R1 parameter is always 1, and the R2 parameter is always 0, as mentioned above. Therefore, once the output-data is output (replayed) one time, the control goes out of the output control sequence illustrated in FIG. 4, and the control waits for an input of the next output-data.

Use Case 5

Explained in Use Case 5 is an example in which the audio output system 100 is applied to a solution for assisting call center tasks. Specifically, used in Use Case 5 is an example of a solution for assisting employees who are working at a call center, and have burdens of keeping listening to the voice for a long time. In Use Case 5, by controlling the output of a virtual sound image, the voice is output in such a manner that the content included in the voice can be understood easily, and the burdens to the ears are reduced. Such an output control of virtual sound images is intended to alleviate the burdens or the fatigue of the employees, effectively. Use Case 5 provides an example in which the parameter table for the audio output system 100 according to the embodiment can be used for such a limited use. Each user can set conditions for replaying voices in advance in such a manner that they can listen to the voice easily, as parameters in the parameter table. Once the user sets the conditions for replaying voices, it is not necessary for them to change the settings every time they listen to a voice. The burdens on the ears of the user are not ignorable when the user listens to the voice for a long time, and "the easiness to listen to" becomes an important factor.

FIG. 11 is a schematic illustrating an example of the parameter information according to the embodiment (for Use Case 5). Specifically, FIG. 11 provides an example of the parameter table used when the audio output system 100 according to the embodiment is applied to a system for operators in a consumer contact center receiving inquiries from customers. In Use Case 5, the telephone calls to the consumer contact center are output in such a manner that the calls are perceived as coming from different directions depending on the content of the telephone calls (complaints, inquiries, applications, and others). With the audio output system 100 according to the embodiment, it is possible to designate a direction resulting in the smallest burden to the ears for complaints that impose the heaviest psychological burdens on the operators. Furthermore, by changing the direction in which the operator perceives the voice depending on the type of content, the operators can be prepared. Furthermore, the virtual sound image processing also has an advantage of suppressing the fatigues on keeping listening, because the operators can perceive the voice applied with the virtual sound image processing as coming from not near their ears but from the distance $r_a$ that is somewhat further away (e.g., several ten centimeters from the ear), compared with when the voice is replayed via an ordinary earphone.

In Use Case 5, as a speaker (a consumer who has made a telephone call) utters one sentence, the voice data corresponding to the sentence will be used as the output-data. The operator starts the application on the terminal in advance. The parameter table and the output-data table having been input with the initial values are downloaded to the terminal. The application is at standby, enabled to readily start its operation when any piece of output-data is received. When the end user (the operator, in this example) picks up the telephone, the voice data corresponding to the telephone call is handled as output-data. In this example of Use Case 5, users (operators) use a system such as an intercom in which a voice over the telephone is handled as an input. Therefore, the voice data input to the user's ears is only the telephone voice having been processed by the application through this device.

As the parameter information generating step 1, the parameter information generating unit 4 sets the time (time stamp) at which the output-data is received to the "time" parameter, and sets the identification number allocated upon the receipt of the output-data to the ID parameter. The parameter information generating unit 4 also stores the "time" parameter and the ID parameter in the output-data table (see FIG. 6).

In Use Case 5, because the latest information is kept being received as the output-data, the D parameter indicating the data processing type is set to the flow type ($\phi$), and the N parameter indicating the data currency is set (defined) to the latest ($\eta$) by default in advance.

The parameter information generating unit 4 then sets the content tag generated based on the content of the output-data to the "content" parameter. In the example illustrated in FIG. 11, the "content" parameter is set with a complaint (X1), an inquiry (X2), an application (X3), or others (X4). The content identification information generating unit 2 determines the content of the input voice using an intention determining engine, for example, and assigns a content tag X1 to X4 depending on the content of the voice.

The parameter information generating step 2 will now be explained. The user in Use Case 5 is an operator who receives the first inquiry. Therefore, the S1 parameter indicating the status 1 is fixed to not addressed yet ($\xi$).

The R1 parameter indicating the repetition control variable 1, because D=$\phi$ and N=$\eta$, as mentioned above, is always 1 in the example illustrated in FIG. 11.

The rule for calculating the R2 parameter is set by the user (operator) in advance. In the example illustrated in FIG. 11, because the user does not listen to the same telephone content twice at that time, a fixed value 0 is set to the R2 parameter in advance.

In Use Case 5, the content tags, are defined by the user (operator) in advance in the parameter table. The conditions for outputting the virtual sound images are designated using the parameters (X1 to X4) representing the tags appended to the content, and the parameters (1 to 4) linking the tags to the output conditions. In the example illustrated in FIG. 11, the conditions for outputting the virtual sound images are set in such a manner that the user perceives the voice as coming from designated directions, e.g., perceives a complaint (X1) from a direction at 135 degrees (from the rear side on the right), and perceives an inquiry (X2) from the direction at 225 degrees (from the rear side on the left), for example, with reference to the front side of the user. By using such settings, the operator can immediately recognize what the telephone call is related to, based on the direction the user perceives the voice.

The parameter information generating step 3 will now be explained. The parameter determined at the parameter information generating step 3 is the "out" parameter indicating an output control. In the example illustrated in FIG. 11, because there is no chance of the operator not listening to a telephone call received from a customer, a fixed value 1 is designated in the "out" parameter. Because the R2 parameter is set to the fixed value 0, once the output-data is output (replayed) one time, the control goes out of the output control sequence illustrated in FIG. 4, and the control waits for an input of the next output-data.

As described above in Use Cases 1 to 5, various numbers, definitions, and the like included in the parameter table for controlling the audio output system 100 according to the embodiment may be set automatically by the audio output system 100, or set by an end user or an administrator or the like. Furthermore, when such settings are set by an end user or an administrator or the like, the settings may be done in advance, or done by an operation input made by the end user or the administrator.

Setting inputs using any kind of methods can be generally used in the structure for controlling the audio output system 100, but when the settings are received via operation inputs, it is preferable for the structure to be provided with an interface allowing the inputter to set the parameters intuitively via the user I/F unit 7. Therefore, in the audio output system 100 according to the embodiment, an input I/F for inputting parameters and definitions, which may be defined by the users, is prepared, and the audio output system 100 is controlled as the results of editions made with the I/F are reflected to the parameter table itself. In this manner, with the audio output system 100 according to the embodiment, the users can easily set the way of the output-data on which virtual sound image processing has been performed, and change the settings easily even after the operation of the audio output system 100 is started.

FIGS. 12 to 15 are schematics illustrating an example of the parameter input I/F according to the embodiment. FIG. 12 illustrates an example of the input I/F for setting (defining) the content identification information (content tags). FIG. 13 illustrates an example of the input I/F for setting (defining) the conditions for outputting the virtual sound images (the distance r and the angle θ). FIG. 14 illustrates an example of the input I/F for setting (defining) the rule for calculating the "out" parameter indicating the output control.

FIG. 15 illustrates an example of the input I/F for setting (defining) the status identification information (status tag). In the example illustrated in FIG. 15, "input" indicates an input value, and "init" indicates an initial value. The "init" is set to the parameter table in an initializing sequence of the audio output system 100 (e.g., during the system startup). The input value is set to the parameter table as the input value is entered (updated) while the audio output system 100 is being used.

The examples illustrated in FIGS. 12 to 15 are merely exemplary, and, in practice, it is necessary to provide the input I/F with a format that ensures practical convenience and simplicity depending on each use case.

Finally, an exemplary hardware configuration of the audio output system 100 according to the embodiment will now be explained.

Exemplary Hardware Configuration

Figure 16:
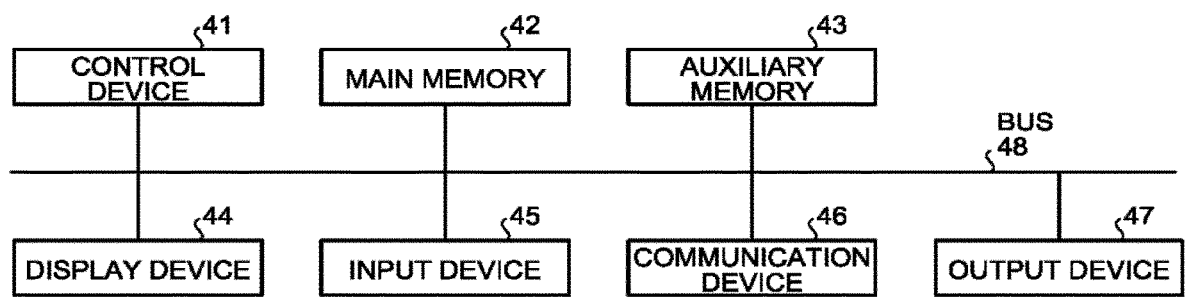
FIG. 16 is a schematic illustrating an exemplary hardware configuration of the audio output system according to the embodiment.

FIG. 16 is a schematic illustrating an exemplary hardware configuration of the audio output system 100 according to the embodiment. The audio output system 100 according to the embodiment includes a control device 41, a main memory 42, an auxiliary memory 43, a display device 44, an input device 45, a communication device 46, and an output device 47. The control device 41, the main memory 42, the auxiliary memory 43, the display device 44, the input device 45, the communication device 46, and the output device 47 are connected to one another via a bus 48.

The audio output system 100 may be a combination of any devices having the hardware configuration described above. For example, the audio output system 100 is configured as a wearable device, a smart device, or a personal computer (PC). Examples of the wearable device include an open-ear type earphone device, a microphone, a speaker, an intercom, and various wearable sensors. Examples of the smart device include a tablet terminal, a smartphone, and a portable terminal with a computing processing power equivalent thereto.

The control device 41 executes a computer program read from the auxiliary memory 43 onto the main memory 42. Examples of the main memory 42 include memories such as a read-only memory (ROM) and a random access memory (RAM). Examples of the auxiliary memory 43 include a hard disk drive (HDD) and a memory card.

The display device 44 displays the status and the like of the audio output system 100, for example. The input device 45 receives operation inputs from the users. The display device 44 and the input device 45 may be implemented by a touch panel or the like having a display function and an input function. Furthermore, the display device 44 and the input device 45 may be provided to another device, and the settings of the audio output system 100 may be changed using that device.

The communication device 46 is an interface for enabling the audio output system 100 to communicate with other devices. The output device 47 is a device such as a speaker for outputting audio. The output device 47 corresponds to the output unit 6 described above.

The computer program executed on the audio output system 100 according to the embodiment is provided as a computer-program product stored in a computer-readable recording medium, such as a compact-disc read-only memory (CD-ROM), a memory card, a compact-disc recordable (CD-R), and a digital versatile disc (DVD), as a file in an installable or executable format.

The computer program executed on the audio output system 100 according to the embodiment may be stored in a computer connected to a network such as the Internet, and be provided by causing the user to download the computer program over the network. Furthermore, the computer program executed by the audio output system 100 according to the embodiment may be provided over a network such as the Internet, without causing the user to download the computer program.

Furthermore, the computer program in the audio output system 100 according to the embodiment may be provided in a manner incorporated in the ROM or the like in advance.

The computer program executed on the audio output system 100 according to the embodiment has a modular structure including functional blocks capable of implementing the functions described above using a computer program. As the actual hardware, by causing the control device 41 to read the computer program from a storage medium, and executing the computer program, the functional blocks described above are loaded onto the main memory 42. In other words, the functional blocks are generated on the main memory 42.

The functions of the audio output system 100 according to the embodiment may be partly or entirely implemented by hardware such as an integrated circuit (IC). An IC can be a processor for executing a dedicated process, for example. Furthermore, when the functions are implemented using a plurality of processors, each of the processors may implement one of the functions, or implement two or more of the functions.

Furthermore, the audio output system 100 according to the embodiment may operate in any configuration. Some of the functions of the audio output system 100 according to the embodiment may be implemented using a server device included in a cloud system built on a network, for example.

As explained above, in the audio output system 100 according to the embodiment, the receiving unit 1 receives voice data or sound data as output-data. The content identification information generating unit 2 generates content identification information for identifying content that is determined from the output-data. The status identification information generating unit 3 generates status identification information for identifying a status from at least one of sensor data and input data. The parameter information generating unit 4 generates parameter information used for controlling output of the output data, from the content identification information and the status identification information. The output control unit 5 then controls the audio output of the output-data using the parameter information.

With such a configuration, it is possible to build the audio output system 100 that can be used for various applications, easily. Specifically, with the audio output system 100 according to the embodiment, it is possible to use the parameter settings to specify the output conditions such as the direction and the distance of a virtual sound image, and to specify whether or not the processed sound image (virtual sound image) is to be output. Therefore, it is possible to support various types of environments, applications, and the like, with a demand for virtual sound image processing. In other words, with the audio output system 100 according to the embodiment, it is possible to support various applications only with one audio output system 100, without reconstructing the entire system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An audio output system comprising:
   a memory; and
   one or more hardware processors electrically coupled to the memory and configured to function as:
   a receiving unit that receives, as output-data to the output, voice data including a voice or sound data including a sound;
   a content identification information generating unit that generates content identification information for identifying content that is determined from the output-data;
   a status identification information generating unit that generates status identification information for identifying a status from at least one of sensor data and input data;
   a parameter information generating unit that generates parameter information used for controlling output of the output-data from the content identification information and the status identification information; and
   an output control unit that controls audio output of the output-data by using the parameter information, wherein
   the parameter information generating unit establishes a link from the parameter information to the output-data,
   the parameter information includes at least:
     a content parameter indicating the content identification information,
     a status parameter indicating the status identification information,
     a first virtual sound image parameter that is linked to the content parameter, the first virtual sound image parameter indicating an output condition including a direction of a virtual sound image and a distance from a sound source of the virtual sound image, and
     a second virtual sound image parameter indicating whether or not to output the virtual sound image that is linked to the status parameter and the content parameter; and
   the output control unit controls the output-data expressed by the direction of the virtual sound image and the distance from the sound source of the virtual sound image based on the first virtual sound image parameter, and controls whether or not to output the virtual sound image based on the second virtual sound image parameter.

2. The system according to claim 1, wherein, when the output-data is the sound data, the content identification information generating unit determines the kind of the sound included in the sound data and generates the content identification information based on a determination result of the sound.

3. The system according to claim 1, wherein, when the output-data is the voice data, the content identification information generating unit determines a language of the speech included in the voice data, acquires a speech recognition result that is obtained by recognizing the speech with a speech recognition engine corresponding to the determined language, and generates the content identification information based on a meaning of the speech recognition result.

4. The system according to claim 2, wherein, when the output-data is the voice data, the content identification information generating unit determines a language of the speech included in the voice data, acquires a speech recognition result that is obtained by recognizing the speech with a speech recognition engine corresponding to the determined language, and generates the content identification information based on a meaning of the speech recognition result.

5. The system according to claim 1, wherein
   the parameter information includes a parameter, a definition of the parameter, and a rule for calculating the parameter,
   the audio output system further comprises a user I/F unit that receives an operation input indicating a change in at least one of the parameter, the definition, and the rule, and
   the parameter information generating unit updates the parameter information based on the operation input.

6. The system according to claim 2, wherein
   the parameter information includes a parameter, a definition of the parameter, and a rule for calculating the parameter,
   the audio output system further comprises a user I/F unit that receives an operation input indicating a change in at least one of the parameter, the definition, and the rule, and
   the parameter information generating unit updates the parameter information based on the operation input.

7. The system according to claim 3, wherein
   the parameter information includes a parameter, a definition of the parameter, and a rule for calculating the parameter,
   the audio output system further comprises a user I/F unit that receives an operation input indicating a change in at least one of the parameter, the definition, and the rule, and
   the parameter information generating unit updates the parameter information based on the operation input.

8. The system according to claim 1, wherein the rule includes at least a rule for calculating the second virtual sound image parameter.

9. The system according to claim 8, wherein
   the parameter information further includes a repetition control parameter for controlling whether or not to repeat outputting the virtual sound image, and
   the rule further includes a rule for calculating the repetition control parameter.

10. The system according to claim 1, wherein the parameter information generating unit groups pieces of the output-data as one data set, and sets a same value at least to the status parameters which are included in the parameter information.

11. The system according to claim 8, wherein the parameter information generating unit groups pieces of the output-data as one data set, and sets a same value at least to the status parameters which are included in the parameter information.

12. The system according to claim 9 wherein the parameter information generating unit groups pieces of the output-data as one data set, and sets a same value at least to the status parameters which are included in the parameter information.

13. An audio output method comprising:
receiving voice data including a voice or sound data including a sound, as output-data to be output;
generating content identification information for identifying content that is determined from the output-data;
generating status identification information for identifying a status from at least one of sensor data and input data;
generating parameter information used for controlling output of the output-data from the content identification information and the status identification information; and
controlling audio output of the output-data by using the parameter information, wherein
the generating of the parameter information includes establishing a link from the parameter information to the output-data,
the parameter information includes at least:
 a content parameter indicating the content identification information,
 a status parameter indicating the status identification information,
 a first virtual sound image parameter that is linked to the content parameter, the first virtual sound image parameter indicating an output condition including a direction of a virtual sound image and a distance from a sound source of the virtual sound image, and
 a second virtual sound image parameter indicating whether or not to output the virtual sound image that is linked to the status parameter and the content parameter; and
the controlling of the audio output includes controlling the output-data expressed by the direction of the virtual sound image and the distance from the sound source of the virtual sound image based on the first virtual sound image parameter, and controlling whether or not to output the virtual sound image based on the second virtual sound image parameter.

14. A computer program product including a non-transitory computer readable medium in which programmed instructions are stored, the programmed instructions causing, when executed by a computer, the computer to perform:
receiving voice data including a voice or sound data including a sound, as output-data to be output;
generating content identification information for identifying content that is determined from the output-data;
generating status identification information for identifying a status from at least one of sensor data and input data;
generating parameter information used for controlling output of the output-data from the content identification information and the status identification information; and
controlling audio output of the output-data by using the parameter information, wherein
the generating of the parameter information includes establishing a link from the parameter information to the output-data,
the parameter information includes at least:
 a content parameter indicating the content identification information,
 a status parameter indicating the status identification information,
 a first virtual sound image parameter that is linked to the content parameter, the first virtual sound image parameter indicating an output condition including a direction of a virtual sound image and a distance from a sound source of the virtual sound image, and
 a second virtual sound image parameter indicating whether or not to output the virtual sound image that is linked to the status parameter and the content parameter; and
the controlling of the audio output includes controlling the output-data expressed by the direction of the virtual sound image and the distance from the sound source of the virtual sound image based on the first virtual sound image parameter, and controlling whether or not to output the virtual sound image based on the second virtual sound image parameter.

* * * * *